(No Model.)
J. H. HEATON.
ANIMAL POKE.
No. 539,811. Patented May 28, 1895.
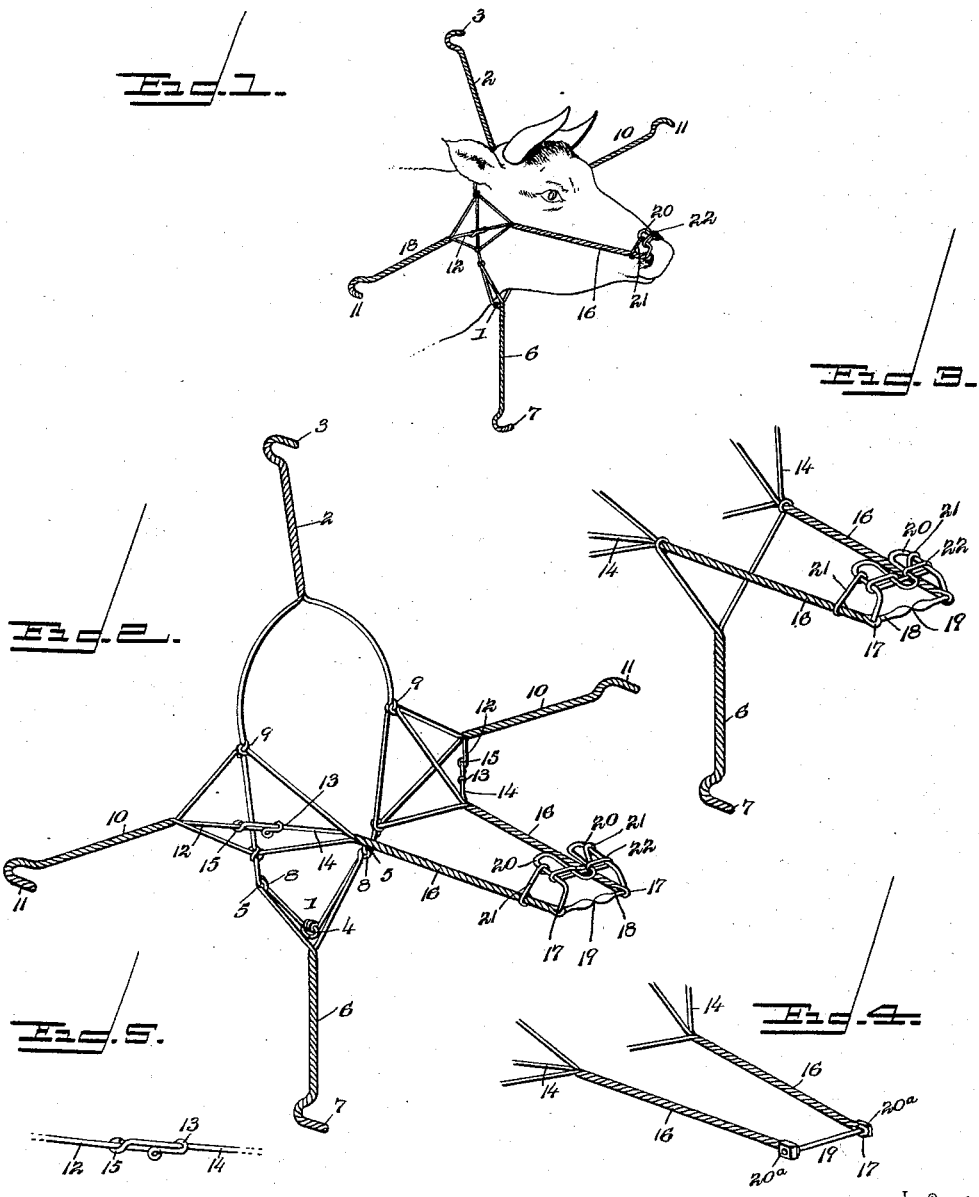
Witnesses
E. N. Stewart
J. A. Owens
Inventor
Jester H. Heaton
By his Attorneys
C. A. Snow & Co.

UNITED STATES PATENT OFFICE.

JESTER H. HEATON, OF ENID, OKLAHOMA TERRITORY.

ANIMAL-POKE.

SPECIFICATION forming part of Letters Patent No. 539,811, dated May 28, 1895.

Application filed September 21, 1894. Serial No. 523,699. (No model.)

*To all whom it may concern:*

Be it known that I, JESTER H. HEATON, a citizen of the United States, residing at Enid, in the county of "O" and Territory of Oklahoma, have invented a new and useful Animal-Poke, of which the following is a specification.

This invention has for its object the production of a device which will effectually prevent the animal to which it is applied from passing fences, hedges, &c., and this end I attain by certain peculiar features of construction whereby I am enabled to connect the device with the animal's nose, so as to pull thereon when a fence is jumped. This will obviously operate to most effectually prevent the further movements of the animal.

In the drawings, Figure 1 represents a perspective view of my complete arrangement, showing it applied to a cow or like animal. Fig. 2 is an enlarged perspective of the device, showing it unemployed; Fig. 3, a view of a modified arrangement of one of the fence-engaging arms; Fig. 4, a view of a modified form of device for attaching the poke to the animal's nose; Fig. 5, a detail perspective of a brace for one of the arms of the device.

The entire device is constructed of steel wire bent into the requisite shape. The body portion or yoke is formed of an integral section of wire having its ends joined to each other at 1, and shaped as an oval, while the upper portion of the yoke is twisted to form an upwardly projecting arm 2, having its upper end terminating in a hook 3, disposed forwardly as shown. The yoke is placed on the animal's neck by manipulating the fastening 1, which may consist of a separate ring 4 or of a mere intertwisting of the wires.

Formed in the yoke at a point just above the fastening 4, and horizontally aligned with each other are the eyes 5, made by forming a kink in the wire. To these eyes the wire 6 is secured by forming in its ends similar devices. The wire 6, is intertwisted to form a rod, such as the rod or arm 2, and has its lower end shaped into a forwardly opening hook 7, while the ends of the wire are spread apart and formed with eyes 8, as shown in the drawings.

About midway the yoke, the sides thereof are formed with eyes 9 and this by twisting also. These eyes are two for each side of the yoke and are provided to permit the attaching of the spread ends of the wire, comprising the arms 10, which are two in number, one for each side of the yoke and which extend out laterally from each side thereof, their ends being formed with forwardly opening hooks 11.

Connected rigidly to the arms 10, and extending inwardly and forwardly therefrom are the wires 12, which are one for each arm, and which have their ends formed with eyes 13. These eyes 13, are adapted to secure the respective wires 14, which are in turn provided with eyes 15, receiving the wires 12, while the wires 14 are rigidly connected to the forwardly projecting arms 16 which will now be described. The arms 16 are, like the remaining arms of the poke, formed of a single piece of wire twisted together and having its ends spread vertically and formed with eyes adapted to operate with the eyes 9 of the yoke and whereby the arms 16 are secured in place.

The wires 14 are joined to the arms 16 by inter-twisting for a short distance; and the arrangement of wires 12 and 14 is to allow the the arms 10, a slight forward movement when the movements of the animal are such as to make it necessary, all of which will be better described hereinafter.

The forward ends of the arms 16 are formed with eyes 17 therein, and these eyes are adapted to permit securing the nose ring 18 in place. This device is formed of two pieces of wire, one of which is bent to form the piercing points 19, which are adapted to pass through the animal's nose, while the remainder of said wire is bent to form two loops 20 projecting upwardly and thence rearwardly so as to lie flat against the upper side of the animal's nose. The second portion 22 of the ring 18 is provided to brace the loops 20 and prevent them from being displaced, and to this end the wire is bent so as to embrace the two loops as shown. The ring 18 is held in place by the binding wires 21, which are two in number, one for each side and which proceed down to the arms 16 to which they are fastened. By these means the ring is prevented from moving forward.

The use of my invention is shown in Fig. 1, and there it will be seen that the yoke is made to embrace the animal's neck, and the points 19 of the ring 18 passed through his nose. This will place the arm 2 vertical and the arms 10, horizontal, while the arm 6 depends from the yoke, all of the hooks of the arms being disposed forwardly. Should an animal so equipped attempt to pass a fence, hedge or other barrier, one of the several arms, through the medium of their hooks, will engage therewith and cause the arms 16 to pull on the ring 18, thereby giving the animal severe pain, which will effectually stop his movements.

It will be observed that the arm 6, is so connected to the yoke that it will be capable of swinging forwardly and incapable of rearward movement, owing to the engagement of the arm with the lower end of the yoke. This construction permits the animal to lie down and to graze with perfect ease, and without causing the ring 18 to inflict any pain on his nose. The horizontal arms G, are provided to engage hedges and similar barriers which have no horizontal wires, while the two vertical wires respectively prevent the animal from passing above or below fences with horizontal wires.

Fig. 3 illustrates a view of a modified arrangement of the arm 6, and this is adapted for use in extreme cases of fence jumping. Here the arm is affixed to the arms 16, at a point just forward of the spread in the wires composing them, and when this arm engages a fence it will draw the arms 16 down with great force and stop the most obstinate and determined jumper.

The modified nose ring is shown in Fig. 4, and consists of simply a steel rod 19, provided at its ends with nuts 20ª, which may be removed and replaced in the operation of securing the rod in place. It is connected to the front ends of the rods 16, by means of the usual eyes thereof as will be understood.

It will be observed that there is no necessity for any great strength or rigidity in the arms of my device since only a slight pull in the nose ring is sufficient to cause the animal great pain and make him retract his movements. The arms may be adjusted at various angles by bending them; while the arms 10, will be allowed sufficient forward play owing to their jointed braces of prior description.

The points of the ring, 18, which enter the animal's nose are formed with enlarged swelled portions, which are provided to help in securing the ring in place, as will be understood.

Changes in the form, proportion and minor details of construction may be resorted to without departing from the spirit or sacrificing any of the advantages of the invention.

Having thus described my invention, what I claim is—

1. An animal poke comprising in its construction a yoke capable of embracing the neck of the animal, an arm formed of two or more sections of wire projecting outwardly therefrom and having the inner ends of the wires spread and pivotally connected to the yoke, a wire secured to the arm and formed with an eye thereon, and a wire secured to the yoke and formed with an eye thereon, the said eye being made to embrace the wire having the eye and on the arm, so as to be capable of sliding thereon while the eye of the latter wire similarly embraces the wire on the yoke, substantially as described.

2. An animal poke, comprising in its construction a yoke capable of embracing the animal and having projecting out from the four respective sides thereof a series of arms, the ends of which are formed with hooks and made capable of engaging a fence or other barrier, two horizontally and forwardly projecting arms rigid on the yoke and having their front ends formed with loops therein, and a nose-ring consisting of an integral wire having its terminals enlarged and pointed, the said wire being passed through the loops of the forwardly projecting arms and bent upwardly and rearwardly so as to lie on the upper side of the animal's nose, the terminals of the wire being capable of piercing the same, substantially as described.

In testimony that I claim the foregoing as my own I have hereto affixed my signature in the presence of two witnesses.

JESTER H. HEATON.

Witnesses:
TREMONT BOYLE,
D. R. OGILVIE.